US012602823B2

(12) United States Patent　　(10) Patent No.:　US 12,602,823 B2
Shi et al.　　(45) Date of Patent:　Apr. 14, 2026

(54) RE-LOCALIZATION OF ROBOT

(71) Applicant: INTEL CORPORATION, Santa Clara, CA (US)

(72) Inventors: Xuesong Shi, Beijing (CN); Yuxin Tian, Beijing (CN); Sangeeta Ghangam, Chandler, AZ (US); Dawei Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 18/254,181

(22) PCT Filed: Dec. 25, 2020

(86) PCT No.: PCT/CN2020/139572
　§ 371 (c)(1),
　(2) Date: May 24, 2023

(87) PCT Pub. No.: WO2022/134057
　PCT Pub. Date: Jun. 30, 2022

(65) Prior Publication Data
　US 2024/0029300 A1　　Jan. 25, 2024

(51) Int. Cl.
　*G06T 7/73*　　(2017.01)
　*G06T 1/00*　　(2006.01)
　　(Continued)

(52) U.S. Cl.
　CPC .............. *G06T 7/74* (2017.01); *G06T 1/0014* (2013.01); *G06T 3/147* (2024.01); *G06T 7/60* (2013.01);
　　(Continued)

(58) Field of Classification Search
　CPC .... G06T 7/74; G06T 7/60; G06T 7/33; G06T 7/73; G06T 1/0014; G06T 3/147;
　　(Continued)

(56) References Cited

U.S. PATENT DOCUMENTS

2019/0329407 A1* 10/2019 Qi ........................ G05D 1/0248
2020/0285247 A1　9/2020 Tan et al.
　　(Continued)

FOREIGN PATENT DOCUMENTS

CN　　104732518 A　6/2015
CN　　108072370 A　5/2018
　　(Continued)

OTHER PUBLICATIONS

D. Li, X. Shi, Q. Long, S. Liu, W. Yang, F. Wang, Q. Wei, F. Qiao, DXSLAM: A Robust and Efficient Visual SLAM System with Deep Features, Aug. 12, 2020, 2008.05416, https://doi.org/10.48550/arXiv.2008.05416 (Year: 2020).*
　　(Continued)

*Primary Examiner* — Ian L Lemieux
*Assistant Examiner* — Paulo Andres Garcia
(74) *Attorney, Agent, or Firm* — Viering, Jentschura & Partner mbB

(57) ABSTRACT

A method for re-localization of the robot may include retrieving, for each of keyframes in a keyframe database of the robot, image features and a pose of the keyframe, the image features of the keyframe comprising a global descriptor and local descriptors of the keyframe (210); extracting image features of a current frame captured by the robot, the image features of the current frame comprising a global descriptor and local descriptors of the current frame (220); determining one or more rough matching frames from the keyframes based on comparison between the global descriptor of each keyframe and the global descriptor of the current frame (230); determining a final matching frame from the one or more rough matching frames based on comparison between the local descriptors of each rough matching frame and the local descriptors of the current frame (240); and calculating a pose of the current frame based on a pose of the
　　(Continued)

current frame based on a pose of the final matching frame (250).

20 Claims, 7 Drawing Sheets

(51) Int. Cl.
     *G06T 3/147*          (2024.01)
     *G06T 7/60*           (2017.01)
(52) U.S. Cl.
     CPC .............. *G06T 2207/10024* (2013.01); *G06T 2207/10028* (2013.01)
(58) Field of Classification Search
     CPC . G06T 2207/10024; G06T 2207/10028; G06T 2207/10016; G06T 2207/20084; G01C 21/20; G05D 1/0274
     See application file for complete search history.

(56)                References Cited

U.S. PATENT DOCUMENTS

| | | | |
|---|---|---|---|
| 2020/0293766 A1 | 9/2020 | Huang et al. | |
| 2022/0172386 A1* | 6/2022 | Liu | G06V 10/774 |
| 2023/0206492 A1* | 6/2023 | Lee | G06T 7/593 |
| | | | 382/103 |
| 2023/0260151 A1* | 8/2023 | Li | G06V 10/457 |
| | | | 382/103 |

FOREIGN PATENT DOCUMENTS

| | | | | | |
|---|---|---|---|---|---|
| CN | 108648274 A | | 10/2018 | | |
| CN | 110243370 A | | 9/2019 | | |
| CN | 110561416 A | | 12/2019 | | |
| CN | 111652934 A | * | 9/2020 | ........... | G06F 18/253 |
| CN | 111724438 A | * | 9/2020 | .............. | G06T 7/74 |
| TW | 201947893 A | | 12/2019 | | |
| TW | I694352 B | | 5/2020 | | |
| WO | 2018048353 A1 | | 3/2018 | | |

OTHER PUBLICATIONS

R. Mur-Artal and J. D. Tardos, Orb-Slam2: An Open-Source SLAM System for Monocular, Stereo, and RGB-D Cameras, IEEE Transactions on Robotics, vol. 33, 2017, http://dx.doi.org/10.1109/TRO.2017.2705103 (Year: 2017).*

P. Sarlin, C. Cadena, R. Siegwart, M. Dymczyk, From Coarse to Fine: Robust Hierarchical Localization at Large Scale, Apr. 8, 2019 , https://arxiv.org/abs/1812.03506 (Year: 2019).*

J. Ma, X. Wang, Y. He, X. Mei and J. Zhao, "Line-Based Stereo SLAM by Junction Matching and Vanishing Point Alignment, " in IEEE Access, vol. 7, pp. 181800-181811, 2019, doi: 10.1109/ACCESS.2019.2960282. (Year: 2019).*

Fu, Qiang & Wang, Jialong & Yu, Hongshan & Ali, Islam & Guo, Feng & Zhang, Hong. (2020). PL-VINS: Real-Time Monocular Visual-Inertial SLAM with Point and Line. 10.48550/arXiv.2009. 07462. (Year: 2020).*

International Search Report of related international application No. PCT/CN/2020/139572 mailed Sep. 26, 2021, 4 pages.

Taiwanese Search Report issued for the corresponding TW patent application No. TW 110134045, dated Dec. 3, 2024, 1 page (for informational purposes only).

* cited by examiner

Tracking                                    Re-localization

200

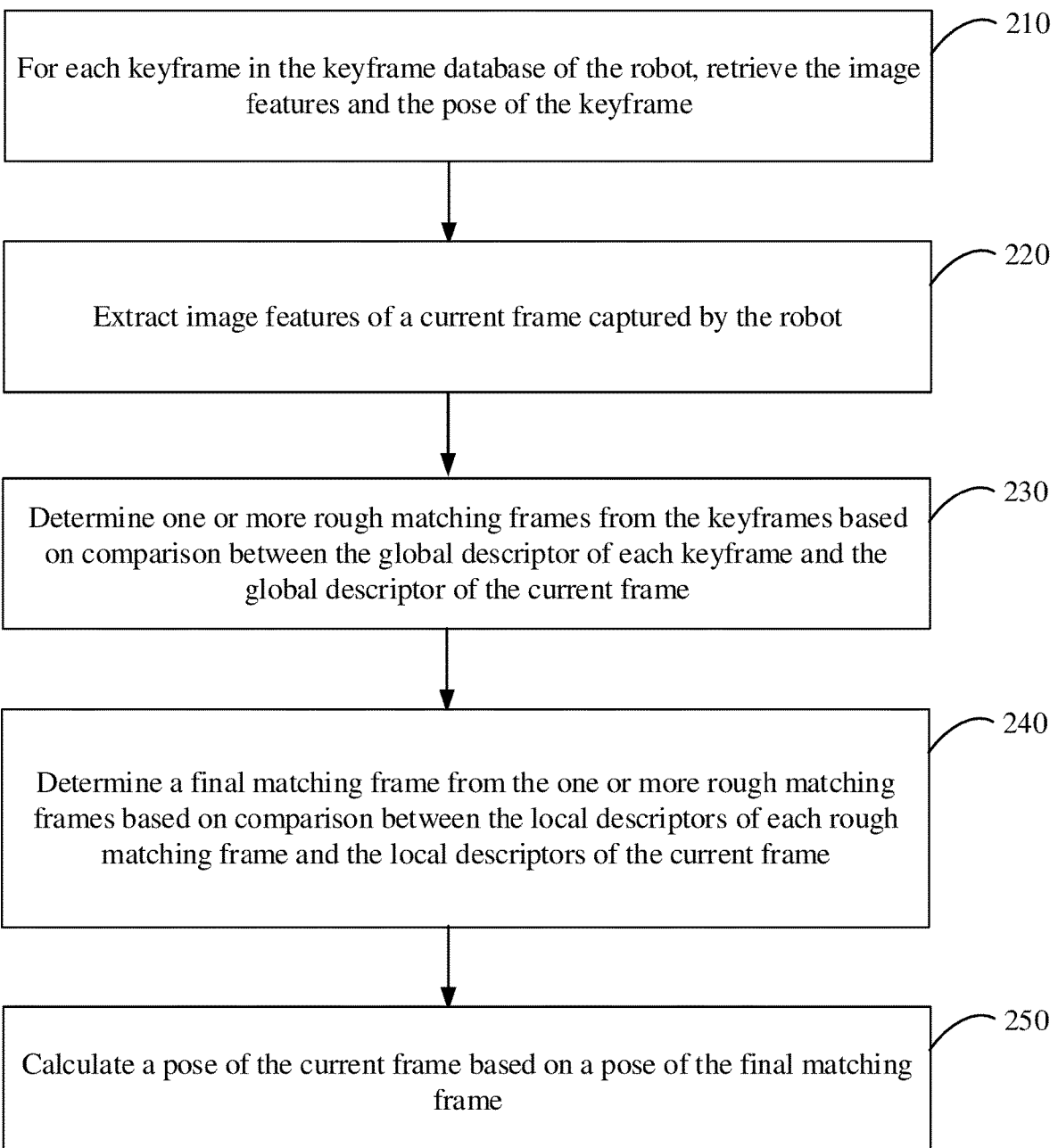

210

For each keyframe in the keyframe database of the robot, retrieve the image features and the pose of the keyframe

220

Extract image features of a current frame captured by the robot

230

Determine one or more rough matching frames from the keyframes based on comparison between the global descriptor of each keyframe and the global descriptor of the current frame

240

Determine a final matching frame from the one or more rough matching frames based on comparison between the local descriptors of each rough matching frame and the local descriptors of the current frame

250

Calculate a pose of the current frame based on a pose of the final matching frame

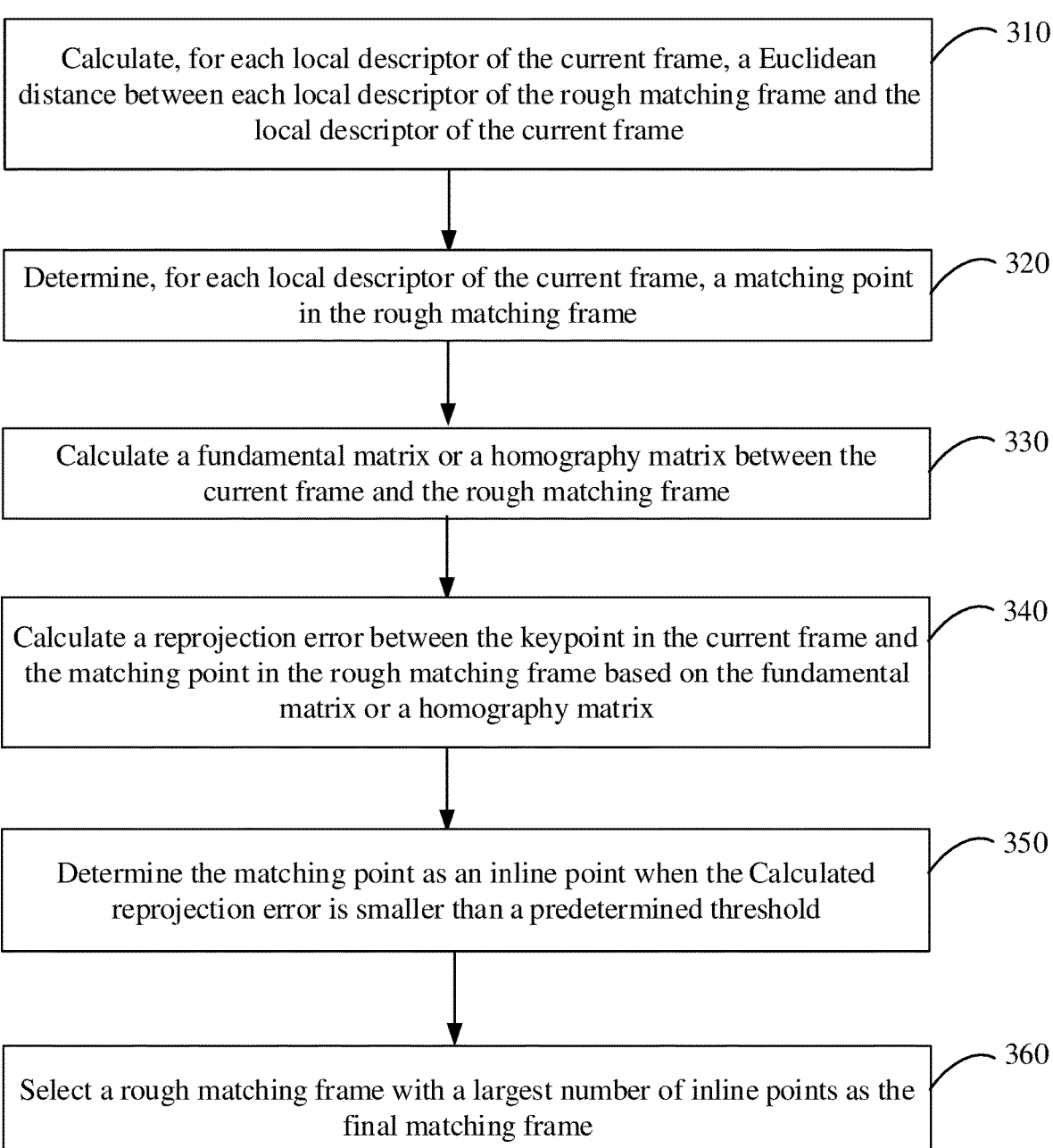

Calculate, for each local descriptor of the current frame, a Euclidean distance between each local descriptor of the rough matching frame and the local descriptor of the current frame — 310

Determine, for each local descriptor of the current frame, a matching point in the rough matching frame — 320

Calculate a fundamental matrix or a homography matrix between the current frame and the rough matching frame — 330

Calculate a reprojection error between the keypoint in the current frame and the matching point in the rough matching frame based on the fundamental matrix or a homography matrix — 340

Determine the matching point as an inline point when the Calculated reprojection error is smaller than a predetermined threshold — 350

Select a rough matching frame with a largest number of inline points as the final matching frame — 360

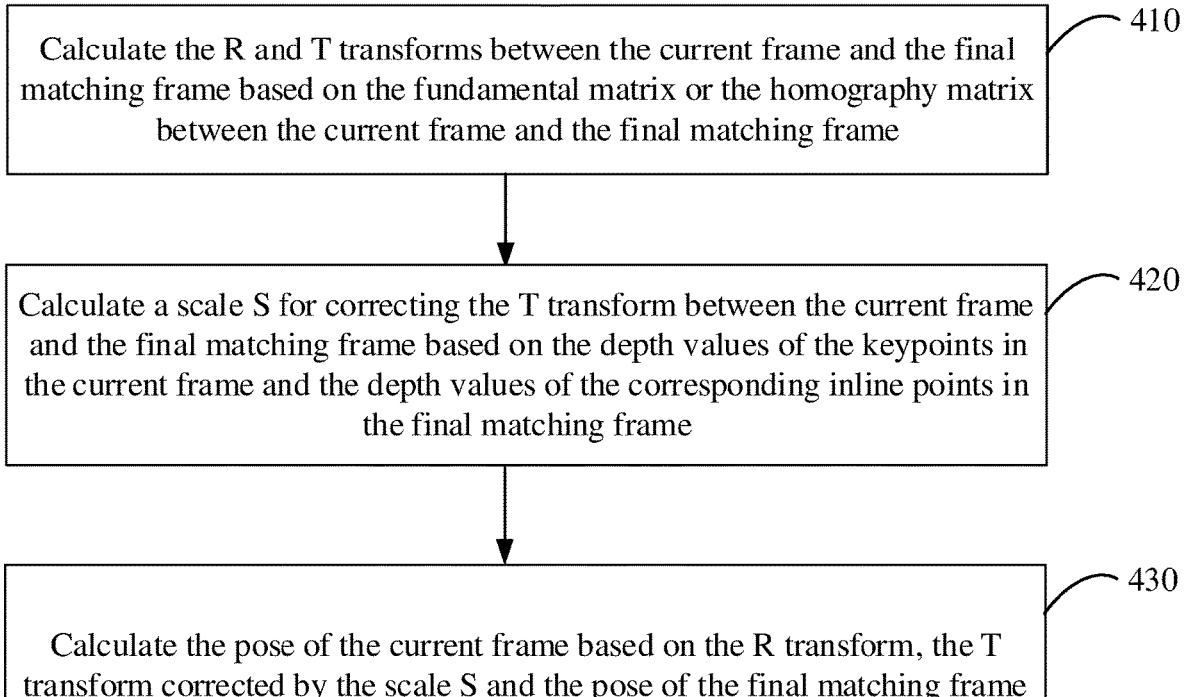

Calculate the R and T transforms between the current frame and the final matching frame based on the fundamental matrix or the homography matrix between the current frame and the final matching frame ~ 410

Calculate a scale S for correcting the T transform between the current frame and the final matching frame based on the depth values of the keypoints in the current frame and the depth values of the corresponding inline points in the final matching frame ~ 420

Calculate the pose of the current frame based on the R transform, the T transform corrected by the scale S and the pose of the final matching frame ~ 430

FIG. 4

RE-LOCALIZATION OF ROBOT

CROSS-REFERENCE TO RELATED APPLICATIONS

This is a national phase of PCT Application PCT/CN2020/139572 filed on Dec. 25, 2020, the entire contents of which are incorporated by reference.

TECHNICAL FIELD

Embodiments described herein generally relate to robot localization, and more particularly relate to methods, apparatuses and systems for re-localization of a robot.

BACKGROUND

A robot may use a localization system to track and estimate a pose of the robot in a working environment. When the localization system fails to track and estimate the pose of the robot, re-localization of the robot may be needed. The localization system may include a Laser Simultaneous Localization and Mapping (L-SLAM) system or a Visual Simultaneous Localization and Mapping (V-SLAM) system.

The L-SLAM system may use submaps for re-localization. In a tracking stage, the system may use multiple consecutive scanning information to create submaps in a two-dimensional (2D) grid and store all the submaps. Then during a re-localization stage, the system may map a current submap to each stored submap and calculate a matching degree between the current submap and each stored submap. When the matching degree exceeds a certain threshold, the re-localization may be successful and the relationship between the current submap and a matching submap may be used to calculate the pose of the robot.

The V-SLAM system may use a method of matching 2D points and three-dimensional (3D) points to perform the re-localization. For example, the system may use a Bag of Words (BoW) method to retrieve a stored keyframe containing the most similar set of keypoints with a current frame; then, as the keypoints of the retrieved keyframe have already been triangulated into 3D landmarks, the system may use a perspective-n-point (PNP) algorithm between the keypoints of the current frame and the 3D landmarks to directly calculate a 6-Degree-of-Freedom (DoF) camera pose of the current frame.

BRIEF DESCRIPTION OF THE DRAWINGS

The various advantages of the embodiments will become apparent to one skilled in the art by reading the following specification and appended claims, and by referencing the following drawings, in which:

FIG. 2 shows an example overall flowchart of a method for re-localization of a robot according to some embodiments of the present disclosure;

FIG. 3 shows an example flowchart illustrating an example process for determining a final matching frame of a current frame during a re-localization process according to some embodiments of the present disclosure;

FIG. 4 shows an example flowchart illustrating an example process for calculating a pose of a current frame based on a pose of a final matching frame during a re-localization process according to some embodiments of the present disclosure;

DETAILED DESCRIPTION

Figure 1:
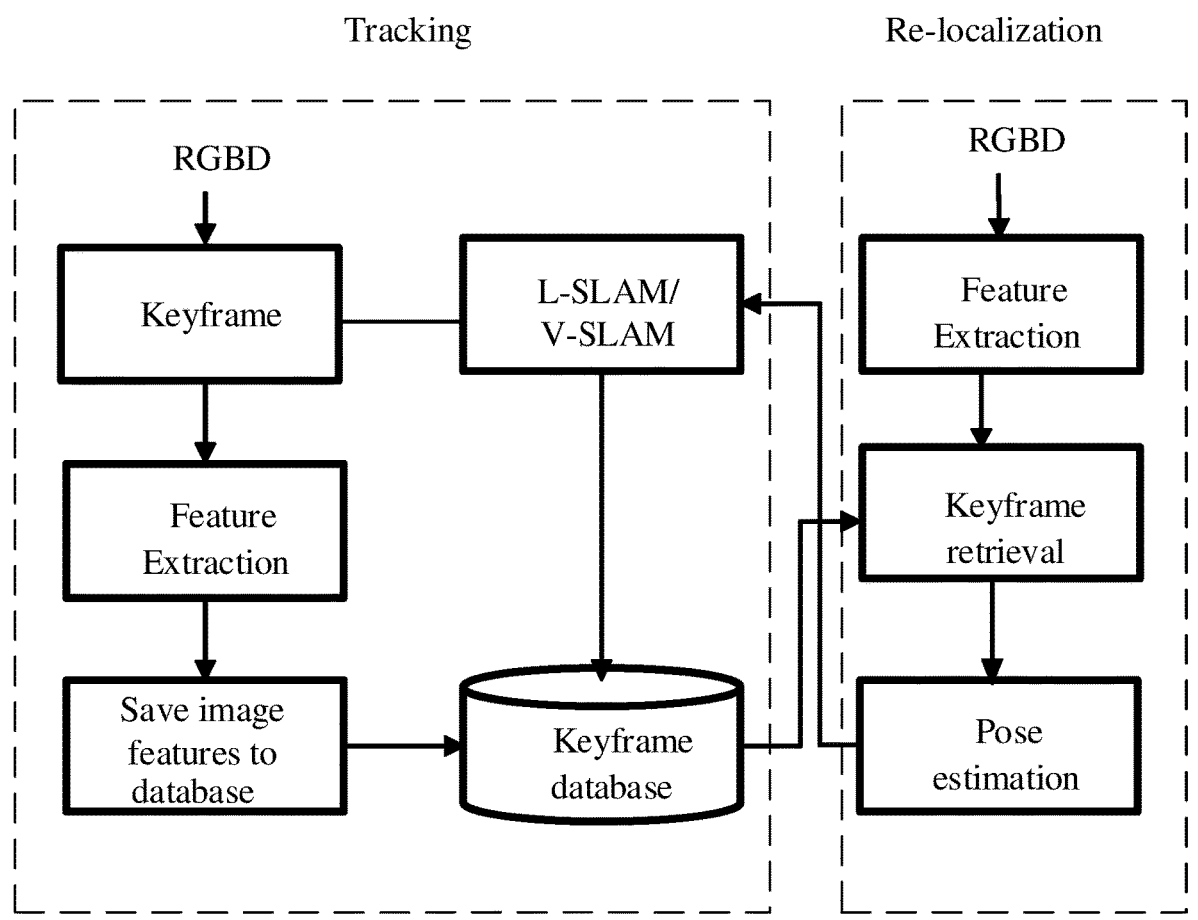
FIG. 1 shows an example system level flowchart for tracking and re-localization of a robot according to some embodiments of the present disclosure.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well-known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

A robot may use a localization system such as L-SLAM and V-SLAM to track and estimate a pose of the robot in a working environment. When the localization system fails to track and estimate the pose of the robot, re-localization of the robot may be needed.

The L-SLAM system may use submaps for re-localization. In a tracking stage, the system may use multiple consecutive scanning information to create submaps in a 2D grid and store all the submaps. Then during a re-localization stage, the system may map a current submap to each stored submap and calculate a matching degree between the current submap and each stored submap. When the matching degree exceeds a certain threshold, the re-localization may be successful and the relationship between the current submap and a matching submap may be used to calculate the pose of the robot.

However, when a scene around the robot or a viewpoint of the robot changes, the current frame may not match the stored submaps well and the re-localization result may be relatively poor. So it may be desirable to improve the performance of the re-localization for changing scenes.

The V-SLAM system may use a method of matching 2D points and 3D points to perform the re-localization. For example, the system may use a BoW method to retrieve a stored keyframe containing the most similar set of keypoints with a current frame; then, as the keypoints of the retrieved keyframe have already been triangulated into 3D landmarks, the system may use a PNP algorithm between the keypoints of the current frame and the 3D landmarks to directly calculate a 6-DoF camera pose of the current frame. The V-SLAM system may perform the re-localization very well in changing scenes. But the V-SLAM system may rely on a 3D map of visual feature points for the re-localization. The 3D map needs to be established in the tracking stage with a high cost of resources.

In view of the above issues related to the re-localization by the L-SLAM system or the V-SLAM system, according to some embodiments of the present disclosure, it is proposed to use a method for re-localization of the robot without relying on a 3D map so as to save the resource cost for the re-localization and meanwhile perform the re-localization well even in changing scenes.

FIG. 1 shows an example system level flowchart for tracking and re-localization of a robot according to some embodiments of the present disclosure.

As shown in FIG. 1, a re-localization apparatus for the robot according to some embodiments of the present disclosure may also involves operations in two stages including a tracking stage and a re-localization stage. During the tracking stage, the apparatus may receive Red Green Blue Depth (RGBD) images from a visual system of the robot and acquire keyframes from the RGBD images. Then the apparatus may perform a feature extraction process for each keyframe to extract image features of the keyframe and then save the image features of the keyframe into a keyframe database of the robot.

According to some embodiments of the present disclosure, the feature extraction process may be based on a Hierarchical Feature Network (HF-Net) model. The HF-Net model is a deep learning model based on deep learning algorithms to extract image features. The image features of an image frame may include a global descriptor that describes features of the entire image frame, a number of local descriptors that describe features of keypoints in the image frame, and depth values for the respective keypoints. An example architecture of the HF-Net model is provided in a paper "From Coarse to Fine: Robust Hierarchical Localization at Large Scale" authored by Paul-Edouard Sarlin, Cesar Cadena, Roland Siegwart, Marcin Dymczyk, Autonomous Systems Lab, ETH Zurich, and Sevensense Robotics AG and issued on Apr. 8, 2019, the content of which is incorporated herein by reference in its entirety.

For example, the re-localization apparatus may establish a Robot Operating System (ROS) node named Feature Extraction to receive the RGBD images, acquire keyframes from the RGBD images, perform the feature extraction for each keyframe via the HF-Net model to extract a global descriptor, first 1000 local descriptors of 1000 keypoints with best response values, and corresponding depth values of the 1000 keypoints, and then publish the global descriptor, the local descriptors and the corresponding depth values.

In addition, the apparatus may establish a ROS node named Relocal to save the information about the keyframes, perform the re-localization process and publish the re-localization results. The Relocal node may operate in two modes including a tracking mode and a re-localization mode. In the tracking mode, the Relocal node may receive the image features of the keyframes from the Feature Extraction node, obtain the poses of the keyframes from the SLAM system of the robot, and save the image features and the poses of the keyframes into the keyframe database.

When the SLAM system of the robot fails to estimate the pose of the robot, the re-localization process for the robot may be needed and then the Relocal node may operate in the re-localization mode. During the re-localization stage, the re-localization apparatus may retrieve the image features and the poses of the keyframes from the keyframe database, extract image features of a current frame captured by the robot, and perform a pose estimation for the current frame based on the pose of a stored keyframe matching the current frame.

Consequently, during the tracking stage, a re-localization system according to some embodiments of the present disclosure may only store the image features and the poses of the keyframes, without running a full V-SLAM or a Structure-from-Motion (SfM) system to create a visual 3D map; and during the re-localization stage, the re-localization system may use a 2D-2D pose estimation method instead of the 2D-3D method (e.g. the PNP algorithm) commonly used in the V-S LAM system.

The re-localization process according to some embodiments of the present disclosure will be described in detail below with reference to FIG. 2 to FIG. 4.

FIG. 2 shows an example overall flowchart of a method 200 for re-localization of a robot according to some embodiments of the present disclosure. The method 200 may be implemented by the re-localization apparatus and may include operations 210 to 250.

At operation 210, for each keyframe in the keyframe database of the robot, the re-localization apparatus may retrieve the image features and the pose of the keyframe. The image features of the keyframe may include a global descriptor and local descriptors of the keyframe.

As described above, the re-localization apparatus may operate in a tracking stage of the robot. During the tracking stage, the apparatus may receive RGBD images from the visual system of the robot; acquire the keyframes from the RGBD images; extract the image features of the keyframes via the HF-Net model; obtain the poses of the keyframes from the SLAM system of the robot; and store the image features and the poses of the keyframes in the keyframe database. Accordingly, when the re-localization of the robot is needed, the re-localization apparatus may retrieve the image features and the poses of the keyframes from the keyframe database, as illustrated in operation 210.

At operation 220, the re-localization apparatus may extract image features of a current frame captured by the robot. The image features of the current frame may include a global descriptor and local descriptors of the current frame. The image features of the current frame may be extracted via the HF-Net model.

At operation 230, the re-localization apparatus may determine one or more rough matching frames from the keyframes based on comparison between the global descriptor of each keyframe and the global descriptor of the current frame.

According to some embodiments of the present disclosure, the re-localization apparatus may calculate an Euclidean distance between the global descriptor of each keyframe and the global descriptor of the current frame and determine a predetermined number of keyframes with a smallest Euclidean distance as the one or more rough matching frames. For example, 15 keyframes with smallest Euclidean distances may be selected as the rough matching frames.

At operation 240, the re-localization apparatus may determine a final matching frame from the one or more rough matching frames based on comparison between the local descriptors of each rough matching frame and the local descriptors of the current frame.

According to the HF-Net model, the local descriptors of the current frame and the local descriptors of the rough matching frame may describe the features of the keypoints in the current frame and the features of the keypoints in the rough matching frame. Thus the final matching frame may be determined by comparing the features of the keypoints in the current frame and each rough matching frame.

At operation 250, the re-localization apparatus may calculate a pose of the current frame based on a pose of the final matching frame. As described above, the pose of the final matching frame may be obtained from the SLAM system of the robot. In addition, the transformation relationships between the current frame and the final matching frame may be determined according to the features of the keypoints in the current frame and each rough matching frame.

FIG. 3 shows an example flowchart illustrating an example process 300 for determining the final matching frame of the current frame during the re-localization process according to some embodiments of the present disclosure.

The process 300 may include operations 310 to 350 executed for each rough matching frame and operation 360 for selecting the final matching frame from the rough matching frames.

At operation 310, with respect to an individual rough matching frame, the re-localization apparatus may calculate, for each local descriptor of the current frame, a Euclidean distance between each local descriptor of the rough matching frame and the local descriptor of the current frame.

At operation 320, the re-localization apparatus may determine, for each local descriptor of the current frame, a matching point in the rough matching frame. The matching point may correspond to a keypoint in the current frame represented by the local descriptor of the current frame, and the matching point may be represented by a local descriptor of the rough matching frame with a minimum Euclidean distance from the local descriptor of the current frame. As a result, for each rough matching frame, one or more matching pairs each including a keypoint in the current frame and a corresponding matching point in the rough matching frame may be determined.

In some embodiments of the present disclosure, for each rough matching frame and each local descriptor of the current frame, only when the minimum Euclidean distance between the local descriptors of the rough matching frame and the local descriptor of the current frame is less than a predetermined percentage (e.g. 90%) of a second smallest Euclidean distance between the local descriptors of the rough matching frame and the local descriptor of the current frame, the matching point may be considered as a valid matching point; otherwise, the matching point may be discarded.

At operation 330, the re-localization apparatus may calculate a fundamental matrix or a homography matrix between the current frame and the rough matching frame based on the one or more matching pairs including the keypoints in the current frame and the matching points in the rough matching frame.

At operation 340, the re-localization apparatus may calculate a reprojection error between the keypoint in the current frame and the matching point in the rough matching frame based on the fundamental matrix or the homography matrix.

At operation 350, the re-localization apparatus may determine the matching point as an inline point when the reprojection error calculated at operation 340 is smaller than a predetermined threshold. In other words, according to the fundamental matrix or the homography matrix, when the reprojection error between the matching point in the rough matching frame and the keypoint in the current frame is small enough, the matching point may be considered to be an inline point.

As illustrated above, for each rough matching frame, the re-localization apparatus may perform the operations 310 to 350 to determine a number of inline points in the rough matching frame that match the keypoints in the current frame well.

Then at operation 360, the re-localization apparatus may select a rough matching frame with a largest number of inline points as the final matching frame.

In some embodiments of the present disclosure, when it is determined that the number of inline points in the rough matching frame is not greater than a predetermined threshold, the rough matching frame may be considered as an incredible rough matching frame and may be discarded. When the number of inline points in the rough matching frame is greater than the predetermined threshold, the re-localization apparatus may derive a Rotation (R) transform and a Translation (T) transform between the rough matching frame and the current frame based on the fundamental matrix or the homography matrix, and calculate the pose of the current frame based on the R and T transforms and the pose of the rough matching frame.

After discarding the incredible rough matching frames, the re-localization apparatus may calculate a deviation between a predetermined percentage (e.g. 30%) of poses of the current frame calculated based on left rough matching frames. When the deviation does not exceed a predetermined threshold, the matching results may be considered as credible results. Then the rough matching frame with the largest number of inline points may be selected as the final matching frame, and the R and T transforms derived according to the final matching frame may be used to calculate the pose of the current frame.

FIG. 4 shows an example flowchart illustrating an example process 400 for calculating the pose of the current frame based on the pose of the final matching frame during the re-localization process according to some embodiments of the present disclosure. The process 400 may include operations 410 to 430.

At operation 410, the re-localization apparatus may calculate the R and T transforms between the current frame and the final matching frame based on the fundamental matrix or the homography matrix between the current frame and the final matching frame.

At operation 420, the re-localization apparatus may calculate a scale S for correcting the T transform between the current frame and the final matching frame based on the depth values of the keypoints in the current frame and the depth values of the corresponding inline points in the final matching frame.

As described above, the image features of an image frame extracted via the HF-Net model may include the depth values of the keypoints in the image frame. In some embodiments of the disclosure, the depth values of the keypoints in the current frame may be used to further correct the T transform calculated at operation 410. For example, the 3D coordinates of the inline points in the final matching frame may be calculated by use of the triangulation method in the two camera coordinate systems of the final matching frame and the current frame. Then an average error of the depth value recovered by the scale and the actual depth value may be calculated and then a scale with the smallest error may be calculated (e.g. by use of weighted least squares iteration) as the final scale S to correct the T transform.

At operation 430, the re-localization apparatus may calculate the pose of the current frame based on the R transform, the T transform corrected by the scale S and the pose of the final matching frame.

Then the re-localization apparatus may publish the pose of the current frame, and the re-localization process may end.

Figure 5:
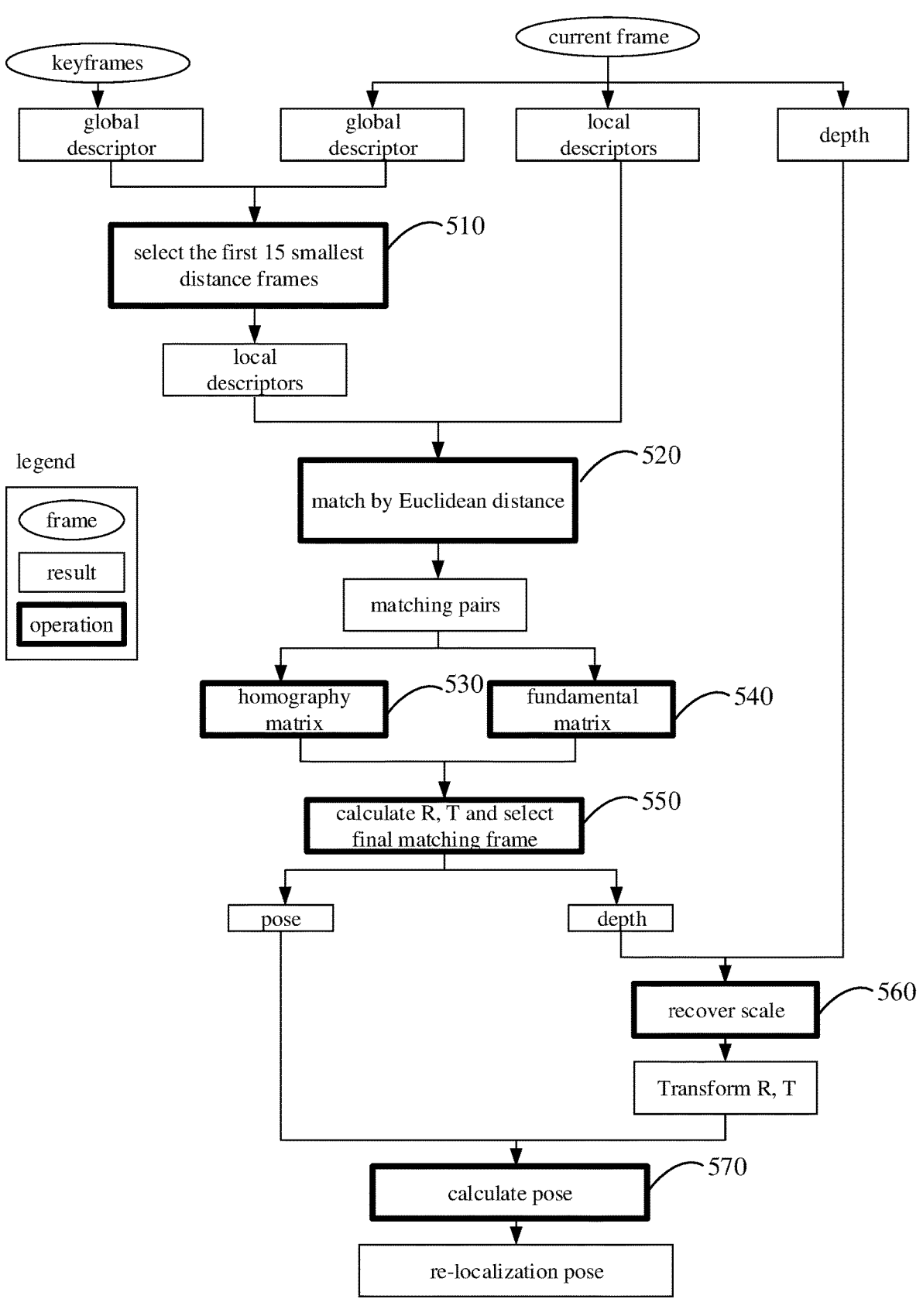
FIG. 5 shows a flow chart of an example re-localization algorithm executed at a re-localization apparatus according to some embodiments of the present disclosure.

FIG. 5 shows a flow chart of an example re-localization algorithm executed at a re-localization apparatus according to some embodiments of the present disclosure. In FIG. 5, the bold boxes denote operations in the re-localization process and the normal boxes denote results produced during the re-localization process.

As shown in FIG. 5, the operation 510 may correspond to the operation 230 in FIG. 2. At the operation 510, the re-localization apparatus may read the global descriptor of each keyframe stored locally in the keyframe database and select the first 15 keyframes with the smallest Euclidean distances as the rough matching frames.

The operation 520 may correspond to the operation 240 in FIG. 2 and the operations 310 and 320 in FIG. 3. At the operation 520, for each rough matching frame, the matching between the local descriptors of the rough matching frame and the local descriptors of the current frame may be performed. For each local descriptor in the current frame, the re-localization apparatus may calculate the Euclidean distance from each local descriptor of the rough matching frame. For example, when the minimum Euclidean distance is less than 0.9 times the second smallest Euclidean distance, the matching may be considered as a successful matching. The local descriptor of the rough matching frame with the minimum Euclidean distance may represent a matching point that corresponds to a keypoint in the current frame represented by the local descriptor of the current frame. Thus for each rough matching frame, one or more matching pairs each including a keypoint in the current frame and a corresponding matching point in the rough matching frame may be determined.

The operations 530 and 540 may correspond to the operation 330 in FIG. 3 and may calculate a fundamental matrix and a homography matrix between the current frame and the rough matching frame based on the one or more matching pairs including the keypoints in the current frame and the matching points in the rough matching frame.

The operation 550 may correspond to the operations 340 to 360 in FIG. 3. At the operation 550, the re-localization apparatus may calculate a reprojection error between the keypoint in the current frame and the matching point in the rough matching frame based on the fundamental matrix or the homography matrix, and may determine the matching point as an inline point when the reprojection error is smaller than a predetermined threshold.

When the number of inline points in the rough matching frame is not greater than a predetermined threshold, the rough matching frame may be discarded. When the number of inline points in the rough matching frame is greater than the predetermined threshold, the re-localization apparatus may derive a R transform and a T transform between the rough matching frame and the current frame based on the fundamental matrix or the homography matrix, and calculate the pose of the current frame based on the R and T transforms and the pose of the rough matching frame.

After discarding incredible rough matching frames, the re-localization apparatus may calculate a deviation between a predetermined percentage (e.g. 30%) of poses of the current frame calculated based on left rough matching frames. When the deviation does not exceed a predetermined threshold, the matching results may be considered as credible results. Then the rough matching frame with the largest number of inline points may be selected as the final matching frame, and the R and T transforms recovered from the final matching frame may be used to calculate the pose of the current frame.

The operations 560 and 570 may correspond to the operations 420 and 430 in FIG. 4. At the operation 560, the re-localization apparatus may calculate a scale S for correcting the T transform between the current frame and the final matching frame based on the depth values of the keypoints in the current frame and the depth values of the corresponding inline points in the final matching frame. At the operation 570, the re-localization apparatus may calculate the pose of the current frame based on the R transform, the T transform corrected by the scale S and the pose of the final matching frame. Then the re-localization apparatus may publish the pose of the current frame, and the re-localization process may end.

The performance of the proposed re-localization algorithm has been compared with the built-in re-localization in the popular L-SLAM system, Cartographer. The re-localization error is tested with the café data sequence from the OpenLORIS-Scene dataset. The average translation/rotation error of Cartographer is 0.36 m/1.57°, while the average translation/rotation error of the proposed re-localization algorithm is 0.27 m/0.61°, lower by a significant margin.

The proposed re-localization algorithm is also compared with a public academic benchmark of visual localization, based on the Aachen dataset. The results are shown in Table 1 below, with a comparison to the original HF-Net method using the 3D map. The performance of the proposed re-localization algorithm is good enough to be comparable with the original HF-Net method using the 3D map, and meanwhile the proposed re-localization algorithm avoids the costly 3D map building process.

TABLE 1

| Algorithm | % of error ≤ 0.25 m/2° | % of error ≤ 0.5 m/5° | % of error ≤ 5 m/10° |
|---|---|---|---|
| Original HF-Net method using 3D map | 76.2% | 85.4% | 91.9% |
| Proposed re-localization algorithm | 71.5% | 80.4% | 85.7% |

Figure 6:
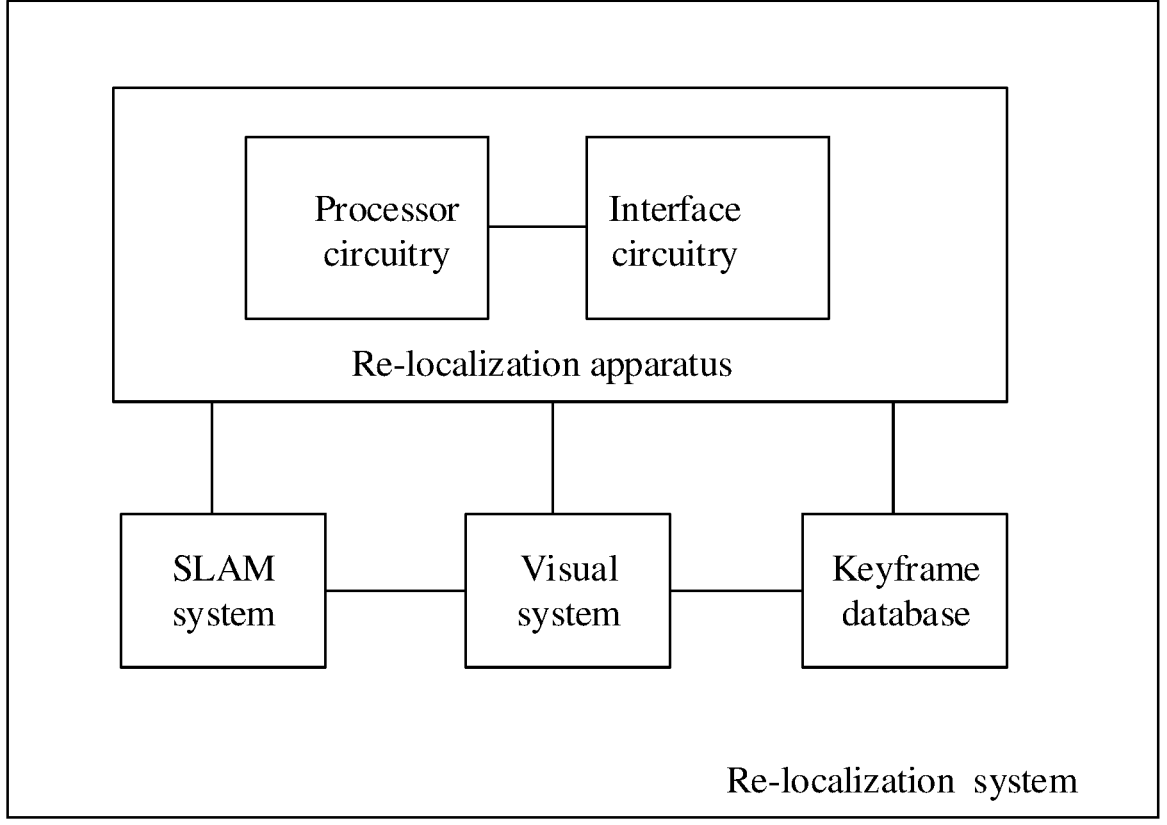
FIG. 6 shows an example system for re-localization of a robot according to some embodiments of the present disclosure.

FIG. 6 shows an example system for re-localization of a robot according to some embodiments of the present disclosure. As shown in FIG. 6, the re-localization system for the robot may include a SLAM system, a visual system, a keyframe database of the robot and a re-localization apparatus according to the embodiments of the present disclosure.

According to the foregoing description, the re-localization apparatus may operate in two modes including a tracking mode and a re-localization mode. In the tracking mode, the re-localization apparatus may receive the RGBD images from the visual system of the robot, acquire the keyframes from the RGBD images, extract the image features of the keyframes via the HF-Net model, obtain the poses of the keyframes from the SLAM system of the robot, and store the image features and the poses of the keyframes into the keyframe database. When the SLAM system fails to estimate the pose of the robot, the re-localization apparatus may operate in the re-localization mode. In the re-localization mode, the re-localization apparatus may retrieve the image features and the poses of the keyframes from the keyframe database, extract image features of a current frame captured by the robot, and perform a pose estimation for the current frame based on the pose of a stored keyframe matching the current frame. Therefore, according to some embodiments of the present disclosure, the re-localization apparatus may interact with the SLAM system, the visual system and the keyframe database of the robot to implement the re-localization for the robot when the re-localization is needed.

According to some embodiments of the present disclosure, the re-localization apparatus may used in various commercialized robots or autonomous systems to enable visual re-localization with minimal overhead. In addition, the image features and the poses of the keyframes stored in the keyframe database may be reused to support navigation for other robots or autonomous systems in the local environment. Furthermore, the global descriptors of the keyframes may be used to monitor environments, and updates about the local descriptors of the keyframes may be provided to or from other robots or autonomous systems.

Figure 7:
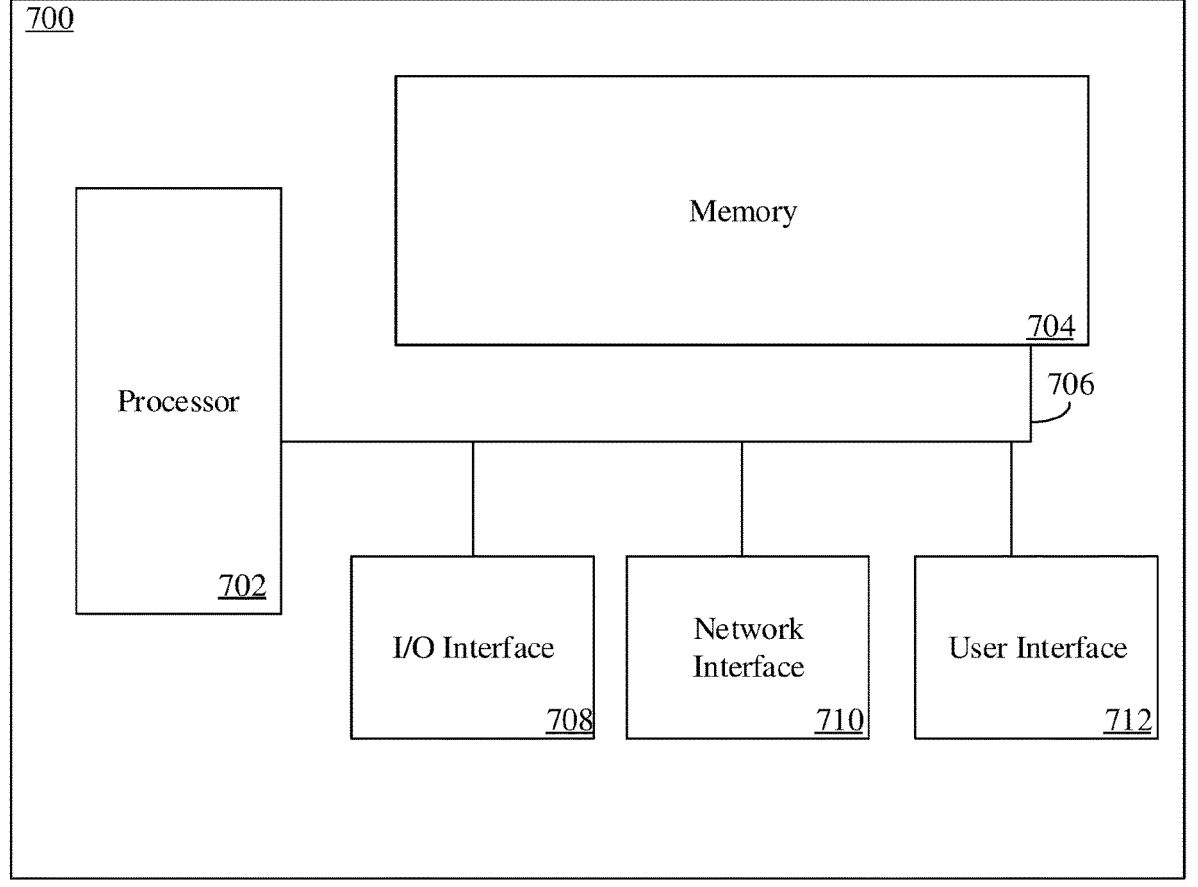
FIG. 7 shows a block diagram of an example computing system that can implement a method for re-localization of a robot according to some embodiments of the present disclosure.

FIG. 7 illustrates an exemplary computing system 700 that can implement a method for re-localization of a robot according to some embodiments of the present disclosure. The computing system 700 may include a processor 702 in communication with a memory 704. The memory 704 can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The computing system 700 may additionally include a local communication interface 706 for connectivity between the various components of the system. For example, the local communication interface 706 may be a local data bus and/or any related address or control busses as may be desired.

The computing system or device 700 may also include an I/O (input/output) interface 708 for controlling the I/O functions of the system, as well as for I/O connectivity to devices outside of the computing system 700. A network interface 710 may also be included for network connectivity. The network interface 710 may control network communications both within the system and outside of the system. The network interface may include a wired interface, a wireless interface, a Bluetooth interface, optical interface, and the like, including appropriate combinations thereof. Furthermore, the computing system 700 may additionally include a user interface 712 as well as various other components that would be beneficial for such a system.

The processor 702 may be a single processor or multiple processors, and the memory 704 may be a single memory or multiple memories. The local communication interface 706 may be used as a pathway to facilitate communication between any of a single processor, multiple processors, a single memory, multiple memories, the various interfaces, and the like, in any useful combination.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium, wherein, when the program code is loaded into and executed by a machine, such as a computer, the machine becomes an apparatus for practicing the various techniques. The non-transitory computer readable storage medium may be a computer readable storage medium that does not include signal. In the case of program code execution on programmable computers, the computing system may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Exemplary systems or devices may include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

ADDITIONAL NOTES AND EXAMPLES

Example 1 includes a method for re-localization of a robot, comprising: retrieving, for each of keyframes in a keyframe database of the robot, image features and a pose of the keyframe, the image features of the keyframe comprising a global descriptor and local descriptors of the keyframe; extracting image features of a current frame captured by the robot, the image features of the current frame comprising a global descriptor and local descriptors of the current frame; determining one or more rough matching frames from the keyframes based on comparison between the global descriptor of each keyframe and the global descriptor of the current frame; determining a final matching frame from the one or more rough matching frames based on comparison between the local descriptors of each rough matching frame and the local descriptors of the current frame; and calculating a pose of the current frame based on a pose of the final matching frame.

Example 2 includes the method of Example 1, wherein determining the one or more rough matching frames comprises: calculating an Euclidean distance between the global descriptor of each keyframe and the global descriptor of the current frame; and determining a predetermined number of keyframes with a smallest Euclidean distance as the one or more rough matching frames.

Example 3 includes the method of Example 1 or 2, wherein determining the final matching frame comprises: for each rough matching frame, calculating, for each local descriptor of the current frame, a Euclidean distance between each local descriptor of the rough matching frame and the local descriptor of the current frame; determining, for each local descriptor of the current frame, a matching point in the rough matching frame corresponding to a keypoint in the current frame represented by the local descriptor of the current frame, wherein the matching point is represented by a local descriptor of the rough matching frame with a minimum Euclidean distance from the local descriptor of the current frame; calculating a fundamental matrix or a homography matrix between the current frame and the rough matching frame based on the keypoint in the current frame and the matching point in the rough matching frame; calculating a reprojection error between the keypoint in the current frame and the matching point in the rough matching frame based on the fundamental matrix or the homography matrix; and determining the matching point as an inline point when the reprojection error is smaller than a predetermined threshold, and selecting a rough matching frame with a largest number of inline points as the final matching frame.

Example 4 includes the method of Example 3, further comprising: discarding, for each rough matching frame and each local descriptor of the current frame, the matching point when the minimum Euclidean distance is not less than a predetermined percentage of a second smallest Euclidean distance between the local descriptors of the rough matching frame and the local descriptor of the current frame.

Example 5 includes the method of Example 3, wherein determining the final matching frame further comprises: for each rough matching frame, when a number of inline points in the rough matching frame is greater than a predetermined threshold, deriving a Rotation transform and a Translation transform between the rough matching frame and the current frame based on the fundamental matrix or the homography matrix; and calculating the pose of the current frame based on the pose of the rough matching frame, the Rotation transform and the Translation transform between the rough matching frame and the current frame; calculating a deviation between a predetermined percentage of poses of the current frame calculated based on corresponding rough matching frames; and selecting the rough matching frame with the largest number of inline points as the final matching frame when the deviation does not exceed a predetermined threshold.

Example 6 includes the method of Example 3, wherein calculating the pose of the current frame comprises: calculating a Rotation transform and a Translation transform between the current frame and the final matching frame based on the fundamental matrix or the homography matrix between the current frame and the final matching frame; and calculating the pose of the current frame based on the Rotation transform, the Translation transform and the pose of the final matching frame.

Example 7 includes the method of Example 3, wherein the image features of the current frame comprise a depth value of the keypoint in the current frame, the image features of the final matching frame comprise a depth value of the inline point in the final matching frame, and calculating the pose of the current frame comprises: calculating a Rotation transform and a Translation transform between the current frame and the final matching frame based on the fundamental matrix or the homography matrix between the current frame and the final matching frame; calculating a scale S for correcting the Translation transform between the current frame and the final matching frame based on the depth values of the keypoints in the current frame and the depth values of the corresponding inline points in the final matching frame; and calculating the pose of the current frame based on the Rotation transform, the Translation transform corrected by the scale S and the pose of the final matching frame.

Example 8 includes the method of any of Examples 1 to 7, further comprising: receiving Red Green Blue Depth (RGBD) images from a visual system of the robot during a tracking stage of the robot; acquiring the keyframes from the RGBD images; extracting the image features of the keyframes via a Hierarchical Feature Network (HF-Net) model; obtaining the poses of the keyframes from a Simultaneous Localization and Mapping (SLAM) system of the robot; and storing the image features and the poses of the keyframes in the keyframe database.

Example 9 includes the method of Example 8, wherein the SLAM system is a Laser SLAM system or a Visual SLAM system.

Example 10 includes the method of any of Examples 1 to 9, wherein extracting the image features of the current frame comprises extracting the image features of the current frame via a Hierarchical Feature Network (HF-Net) model.

Example 11 includes an apparatus for re-localization of a robot, comprising interface circuitry; processor circuitry coupled to the interface circuitry and configured to: retrieve, for each of keyframes in a keyframe database of the robot, image features and a pose of the keyframe from the keyframe database via the interface circuitry, the image features of the keyframe comprising a global descriptor and local descriptors of the keyframe; extract image features of a current frame captured by the robot, the image features of the current frame comprising a global descriptor and local descriptors of the current frame; determine one or more rough matching frames based on comparison between the global descriptor of each keyframe and the global descriptor of the current frame; determine a final matching frame based on comparison between the local descriptors of each rough matching frame and the local descriptors of the current frame; and calculate a pose of the current frame based on a pose of the final matching frame.

Example 12 includes the apparatus of Example 11, wherein the processor circuitry is configured to determine the one or more rough matching frames by: calculating an Euclidean distance between the global descriptor of each keyframe and the global descriptor of the current frame; and determining a predetermined number of keyframes with a smallest Euclidean distance as the one or more rough matching frames.

Example 13 includes the apparatus of Example 11 or 12, wherein the processor circuitry is configured to determine the final matching frame by: for each rough matching frame, calculating, for each local descriptor of the current frame, a Euclidean distance between each local descriptor of the rough matching frame and the local descriptor of the current frame; determining, for each local descriptor of the current frame, a matching point in the rough matching frame corresponding to a keypoint in the current frame represented by the local descriptor of the current frame, wherein the matching point is represented by a local descriptor of the rough matching frame with a minimum Euclidean distance from the local descriptor of the current frame; calculating a fundamental matrix or a homography matrix between the current frame and the rough matching frame based on the keypoint in the current frame and the matching point in the rough matching frame; calculating a reprojection error between the keypoint in the current frame and the matching point in the rough matching frame based on the fundamental matrix or the homography matrix; and determining the matching point as an inline point when the reprojection error is smaller than a predetermined threshold, and selecting a rough matching frame with a largest number of inline points as the final matching frame.

Example 14 includes the apparatus of Example 13, wherein the processor circuitry is further configured to: discard, for each rough matching frame and each local descriptor of the current frame, the matching point when the minimum Euclidean distance is not less than a predetermined percentage of a second smallest Euclidean distance between the local descriptors of the rough matching frame
and the local descriptor of the current frame.

Example 15 includes the apparatus of Example 13,
wherein the processor circuitry is configured to determine
the final matching frame further by: for each rough matching
frame, when a number of inline points in the rough matching
frame is greater than a predetermined threshold, deriving a
Rotation transform and a Translation transform between the
rough matching frame and the current frame based on the
fundamental matrix or the homography matrix; and calcu-
lating the pose of the current frame based on the pose of the
rough matching frame, the Rotation transform and the
Translation transform between the rough matching frame
and the current frame; calculating a deviation between a
predetermined percentage of poses of the current frame
calculated based on corresponding rough matching frames;
and selecting the rough matching frame with the largest
number of inline points as the final matching frame when the
deviation does not exceed a predetermined threshold.

Example 16 includes the apparatus of Example 13,
wherein the processor circuitry is configured to calculate the
pose of the current frame by: calculating a Rotation trans-
form and a Translation transform between the current frame
and the final matching frame based on the fundamental
matrix or the homography matrix between the current frame
and the final matching frame; and calculating the pose of the
current frame based on the Rotation transform, the Trans-
lation transform and the pose of the final matching frame.

Example 17 includes the apparatus of Example 13,
wherein the image features of the current frame comprise a
depth value of the keypoint in the current frame, the image
features of the final matching frame comprise a depth value
of the inline point in the final matching frame, and the
processor circuitry is configured to calculate the pose of the
current frame by: calculating a Rotation transform and a
Translation transform between the current frame and the
final matching frame based on the fundamental matrix or the
homography matrix between the current frame and the final
matching frame; calculating a scale S for correcting the
Translation transform between the current frame and the
final matching frame based on the depth values of the
keypoints in the current frame and the depth values of the
corresponding inline points in the final matching frame; and
calculating the pose of the current frame based on the
Rotation transform, the Translation transform corrected by
the scale S and the pose of the final matching frame.

Example 18 includes the apparatus of any of Examples 11
to 17, wherein the interface circuitry is coupled to a visual
system and a Simultaneous Localization and Mapping
(SLAM) system of the robot and the processor circuitry is
further configured to: acquire the keyframes from Red Green
Blue Depth (RGBD) images received via the interface
circuitry from the visual system of the robot during a
tracking stage of the robot; extract the image features of the
keyframes via a Hierarchical Feature Network (HF-Net)
model; obtain the poses of the keyframes via the interface
circuitry from the SLAM system of the robot; and store the
image features and the poses of the keyframes in the
keyframe database via the interface circuitry.

Example 19 includes the apparatus of Example 18,
wherein the SLAM system is a Laser SLAM system or a
Visual SLAM system.

Example 20 includes the apparatus of any of Examples 11
to 19, wherein the processor circuitry is configured to extract
the image features of the current frame via a Hierarchical
Feature Network (HF-Net) model.

Example 21 includes a computer-readable medium having
instructions stored thereon, wherein the instructions, when
executed by processor circuitry, cause the processor cir-
cuitry to: retrieve, for each of keyframes in a keyframe
database of the robot, image features and a pose of the
keyframe, the image features of the keyframe comprising a
global descriptor and local descriptors of the keyframe;
extract image features of a current frame captured by the
robot, the image features of the current frame comprising a
global descriptor and local descriptors of the current frame;
determine one or more rough matching frames from the
keyframes based on comparison between the global descrip-
tor of each keyframe and the global descriptor of the current
frame; determine a final matching frame from the one or
more rough matching frames based on comparison between
the local descriptors of each rough matching frame and the
local descriptors of the current frame; and calculate a pose
of the current frame based on a pose of the final matching
frame.

Example 22 includes the computer-readable medium of
Example 21, wherein the instructions, when executed by the
processor circuitry, cause the processor circuitry to deter-
mine the one or more rough matching frames by: calculating
an Euclidean distance between the global descriptor of each
keyframe and the global descriptor of the current frame; and
determining a predetermined number of keyframes with a
smallest Euclidean distance as the one or more rough
matching frames.

Example 23 includes the computer-readable medium of
Example 21 or 22, wherein the instructions, when executed
by the processor circuitry, cause the processor circuitry to
determine the final matching frame by: for each rough
matching frame, calculating, for each local descriptor of the
current frame, a Euclidean distance between each local
descriptor of the rough matching frame and the local
descriptor of the current frame; determining, for each local
descriptor of the current frame, a matching point in the
rough matching frame corresponding to a keypoint in the
current frame represented by the local descriptor of the
current frame, wherein the matching point is represented by
a local descriptor of the rough matching frame with a
minimum Euclidean distance from the local descriptor of the
current frame; calculating a fundamental matrix or a homog-
raphy matrix between the current frame and the rough
matching frame based on the keypoint in the current frame
and the matching point in the rough matching frame; cal-
culating a reprojection error between the keypoint in the
current frame and the matching point in the rough matching
frame based on the fundamental matrix or the homography
matrix; and determining the matching point as an inline
point when the reprojection error is smaller than a prede-
termined threshold, and selecting a rough matching frame
with a largest number of inline points as the final matching
frame.

Example 24 includes the computer-readable medium of
Example 23, wherein the instructions, when executed by the
processor circuitry, cause the processor circuitry further to:
discard, for each rough matching frame and each local
descriptor of the current frame, the matching point when the
minimum Euclidean distance is not less than a predeter-
mined percentage of a second smallest Euclidean distance
between the local descriptors of the rough matching frame
and the local descriptor of the current frame.

Example 25 includes the computer-readable medium of
Example 23, wherein the instructions, when executed by the
processor circuitry, cause the processor circuitry to deter-
mine the final matching frame further by: for each rough matching frame, when a number of inline points in the rough matching frame is greater than a predetermined threshold, deriving a Rotation transform and a Translation transform between the rough matching frame and the current frame based on the fundamental matrix or the homography matrix; and calculating the pose of the current frame based on the pose of the rough matching frame, the Rotation transform and the Translation transform between the rough matching frame and the current frame; calculating a deviation between a predetermined percentage of poses of the current frame calculated based on corresponding rough matching frames; and selecting the rough matching frame with the largest number of inline points as the final matching frame when the deviation does not exceed a predetermined threshold.

Example 26 includes the computer-readable medium of Example 23, wherein the instructions, when executed by the processor circuitry, cause the processor circuitry to calculate the pose of the current frame by: calculating a Rotation transform and a Translation transform between the current frame and the final matching frame based on the fundamental matrix or the homography matrix between the current frame and the final matching frame; and calculating the pose of the current frame based on the Rotation transform, the Translation transform and the pose of the final matching frame.

Example 27 includes the computer-readable medium of Example 23, wherein the image features of the current frame comprise a depth value of the keypoint in the current frame, the image features of the final matching frame comprise a depth value of the inline point in the final matching frame, and the instructions, when executed by the processor circuitry, cause the processor circuitry to calculate the pose of the current frame by: calculating a Rotation transform and a Translation transform between the current frame and the final matching frame based on the fundamental matrix or the homography matrix between the current frame and the final matching frame; calculating a scale S for correcting the Translation transform between the current frame and the final matching frame based on the depth values of the keypoints in the current frame and the depth values of the corresponding inline points in the final matching frame; and calculating the pose of the current frame based on the Rotation transform, the Translation transform corrected by the scale S and the pose of the final matching frame.

Example 28 includes the computer-readable medium of any of Examples 21 to 27, wherein the instructions, when executed by the processor circuitry, cause the processor circuitry further to: acquire the keyframes from Red Green Blue Depth (RGBD) images received from a visual system of the robot during a tracking stage of the robot; extract the image features of the keyframes via a Hierarchical Feature Network (HF-Net) model; obtain the poses of the keyframes from a Simultaneous Localization and Mapping (SLAM) system of the robot; and store the image features and the poses of the keyframes in the keyframe database.

Example 29 includes the computer-readable medium of Example 28, wherein the SLAM system is a Laser SLAM system or a Visual SLAM system.

Example 30 includes the computer-readable medium of any of Examples 21 to 29, wherein the instructions, when executed by the processor circuitry, cause the processor circuitry to extract the image features of the current frame via a Hierarchical Feature Network (HF-Net) model.

Example 31 includes an apparatus for re-localization of a robot, comprising: means for retrieving, for each of keyframes in a keyframe database of the robot, image features and a pose of the keyframe, the image features of the keyframe comprising a global descriptor and local descriptors of the keyframe; means for extracting image features of a current frame captured by the robot, the image features of the current frame comprising a global descriptor and local descriptors of the current frame; means for determining one or more rough matching frames from the keyframes based on comparison between the global descriptor of each keyframe and the global descriptor of the current frame; means for determining a final matching frame from the one or more rough matching frames based on comparison between the local descriptors of each rough matching frame and the local descriptors of the current frame; and means for calculating a pose of the current frame based on a pose of the final matching frame.

Example 32 includes the apparatus of Example 31, wherein the means for determining the one or more rough matching frames comprises: means for calculating an Euclidean distance between the global descriptor of each keyframe and the global descriptor of the current frame; and means for determining a predetermined number of keyframes with a smallest Euclidean distance as the one or more rough matching frames.

Example 33 includes the apparatus of Example 31 or 32, wherein the means for determining the final matching frame comprises: for each rough matching frame, means for calculating, for each local descriptor of the current frame, a Euclidean distance between each local descriptor of the rough matching frame and the local descriptor of the current frame; means for determining, for each local descriptor of the current frame, a matching point in the rough matching frame corresponding to a keypoint in the current frame represented by the local descriptor of the current frame, wherein the matching point is represented by a local descriptor of the rough matching frame with a minimum Euclidean distance from the local descriptor of the current frame; means for calculating a fundamental matrix or a homography matrix between the current frame and the rough matching frame based on the keypoint in the current frame and the matching point in the rough matching frame; means for calculating a reprojection error between the keypoint in the current frame and the matching point in the rough matching frame based on the fundamental matrix or the homography matrix; and means for determining the matching point as an inline point when the reprojection error is smaller than a predetermined threshold, and means for selecting a rough matching frame with a largest number of inline points as the final matching frame.

Example 34 includes the apparatus of Example 33, further comprising: means for discarding, for each rough matching frame and each local descriptor of the current frame, the matching point when the minimum Euclidean distance is not less than a predetermined percentage of a second smallest Euclidean distance between the local descriptors of the rough matching frame and the local descriptor of the current frame.

Example 35 includes the apparatus of Example 33, wherein the means for determining the final matching frame further comprises: for each rough matching frame, when a number of inline points in the rough matching frame is greater than a predetermined threshold, means for deriving a Rotation transform and a Translation transform between the rough matching frame and the current frame based on the fundamental matrix or the homography matrix; and means for calculating the pose of the current frame based on the pose of the rough matching frame, the Rotation transform and the Translation transform between the rough matching frame and the current frame; means for calculating a deviation between a predetermined percentage of poses of the current frame calculated based on corresponding rough matching frames; and means for selecting the rough matching frame with the largest number of inline points as the final matching frame when the deviation does not exceed a predetermined threshold.

Example 36 includes the apparatus of Example 33, wherein the means for calculating the pose of the current frame comprises: means for calculating a Rotation transform and a Translation transform between the current frame and the final matching frame based on the fundamental matrix or the homography matrix between the current frame and the final matching frame; and means for calculating the pose of the current frame based on the Rotation transform, the Translation transform and the pose of the final matching frame.

Example 37 includes the apparatus of Example 33, wherein the image features of the current frame comprise a depth value of the keypoint in the current frame, the image features of the final matching frame comprise a depth value of the inline point in the final matching frame, and the means for calculating the pose of the current frame comprises: means for calculating a Rotation transform and a Translation transform between the current frame and the final matching frame based on the fundamental matrix or the homography matrix between the current frame and the final matching frame; means for calculating a scale S for correcting the Translation transform between the current frame and the final matching frame based on the depth values of the keypoints in the current frame and the depth values of the corresponding inline points in the final matching frame; and means for calculating the pose of the current frame based on the Rotation transform, the Translation transform corrected by the scale S and the pose of the final matching frame.

Example 38 includes the apparatus of any of Examples 31 to 37, further comprising: means for receiving Red Green Blue Depth (RGBD) images from a visual system of the robot during a tracking stage of the robot; means for acquiring the keyframes from the RGBD images; means for extracting the image features of the keyframes via a Hierarchical Feature Network (HF-Net) model; means for obtaining the poses of the keyframes from a Simultaneous Localization and Mapping (SLAM) system of the robot; and means for storing the image features and the poses of the keyframes in the keyframe database.

Example 39 includes the apparatus of Example 38, wherein the SLAM system is a Laser SLAM system or a Visual SLAM system.

Example 40 includes the apparatus of any of Examples 31 to 39, wherein the means for extracting the image features of the current frame comprises means for extracting the image features of the current frame via a Hierarchical Feature Network (HF-Net) model.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for re-localization of a robot, comprising:

retrieving, for each keyframe of a set of keyframes in a keyframe database of the robot, image features and a pose of the keyframe, the image features of the keyframe comprising a global descriptor and local descriptors of the keyframe;

extracting image features of a current frame captured by the robot, the image features of the current frame comprising a global descriptor and local descriptors of the current frame;

determining one or more rough matching frames from the set of keyframes based on comparison between the global descriptor of each keyframe and the global descriptor of the current frame;

determining a final matching frame from the one or more rough matching frames based on comparison between the local descriptors of each rough matching frame and the local descriptors of the current frame, wherein determining the final matching frame comprises:

for each rough matching frame, determining, for each local descriptor of the current frame, a matching point in the rough matching frame corresponding to a keypoint in the current frame represented by the local descriptor of the current frame;

calculating a fundamental matrix or a homography matrix between the current frame and the rough matching frame based on the keypoint in the current frame and the matching point in the rough matching frame;

calculating a reprojection error between the keypoint in the current frame and the matching point in the rough matching frame based on the fundamental matrix or the homography matrix; and determining the matching point as an inline point when the reprojection error is smaller than a predetermined threshold, and selecting a rough matching frame with a largest number of inline points as the final matching frame; and calculating a pose of the current frame based on a pose of the final matching frame.

2. The method of claim 1, wherein determining the one or more rough matching frames comprises:

calculating a Euclidean distance between the global descriptor of each keyframe and the global descriptor of the current frame; and determining a predetermined number of keyframes with a smallest Euclidean distance as the one or more rough matching frames.

3. The method of claim 1, wherein determining the final matching frame comprises:

for each rough matching frame, calculating, for each local descriptor of the current frame, a Euclidean distance between each local descriptor of the rough matching frame and the local descriptor of the current frame, wherein the matching point in the rough matching frame is represented by a local descriptor of the rough matching frame with a minimum Euclidean distance from the local descriptor of the current frame.

4. The method of claim 3, further comprising:

discarding, for each rough matching frame and each local descriptor of the current frame, the matching point when the minimum Euclidean distance is not less than a predetermined percentage of a second smallest Euclidean distance between the local descriptors of the rough matching frame and the local descriptor of the current frame.

5. The method of claim 3, wherein determining the final matching frame further comprises:

for each rough matching frame, when a number of inline points in the rough matching frame is greater than a predetermined threshold, deriving a Rotation transform and a Translation transform between the rough matching frame and the current frame based on the fundamental matrix or the homography matrix; and calculating the pose of the current frame based on the pose of the rough matching frame, the Rotation transform and the Translation transform between the rough matching frame and the current frame;

calculating a deviation between a predetermined percentage of poses of the current frame calculated based on corresponding rough matching frames; and selecting the rough matching frame with the largest number of inline points as the final matching frame when the deviation does not exceed a predetermined threshold.

6. The method of claim 3, wherein calculating the pose of the current frame comprises:

calculating a Rotation transform and a Translation transform between the current frame and the final matching frame based on the fundamental matrix or the homography matrix between the current frame and the final matching frame; and calculating the pose of the current frame based on the Rotation transform, the Translation transform and the pose of the final matching frame.

7. The method of claim 3, wherein the image features of the current frame comprise a depth value of the keypoint in the current frame, the image features of the final matching frame comprise a depth value of the inline point in the final matching frame, and calculating the pose of the current frame comprises:

calculating a Rotation transform and a Translation transform between the current frame and the final matching frame based on the fundamental matrix or the homography matrix between the current frame and the final matching frame;

calculating a scale S for correcting the Translation transform between the current frame and the final matching frame based on the depth values of the keypoints in the current frame and the depth values of the corresponding inline points in the final matching frame; and calculating the pose of the current frame based on the Rotation transform, the Translation transform corrected by the scale S and the pose of the final matching frame.

8. The method of claim 1, further comprising:

receiving Red Green Blue Depth (RGBD) images from a visual system of the robot during a tracking stage of the robot;

acquiring the set of keyframes from the RGBD images;

extracting the image features of the set of keyframes via a Hierarchical Feature Network (HF-Net) model;

obtaining the poses of the set of keyframes from a Simultaneous Localization and Mapping (SLAM) system of the robot; and storing the image features and the poses of the set of keyframes in the keyframe database.

9. The method of claim 8, wherein the SLAM system is a Laser SLAM system or a Visual SLAM system.

10. The method of claim 1, wherein extracting the image features of the current frame comprises extracting the image features of the current frame via a Hierarchical Feature Network (HF-Net) model.

11. An apparatus for re-localization of a robot, comprising interface circuitry; processor circuitry coupled to the interface circuitry and configured to:

retrieve, for each keyframe of a set of keyframes in a keyframe database of the robot, image features and a pose of the keyframe from the keyframe database via the interface circuitry, the image features of the keyframe comprising a global descriptor and local descriptors of the keyframe;

extract image features of a current frame captured by the robot, the image features of the current frame comprising a global descriptor and local descriptors of the current frame;

determine one or more rough matching frames based on comparison between the global descriptor of each keyframe and the global descriptor of the current frame;

21 determine a final matching frame based on comparison between the local descriptors of each rough matching frame and the local descriptors of the current frame, wherein the processor circuitry configured to determine the final matching frame comprises the processor circuitry to:

for each rough matching frame, determine, for each local descriptor of the current frame, a matching point in the rough matching frame corresponding to a keypoint in the current frame represented by the local descriptor of the current frame;

calculate a fundamental matrix or a homography matrix between the current frame and the rough matching frame based on the keypoint in the current frame and the matching point in the rough matching frame;

calculate a reprojection error between the keypoint in the current frame and the matching point in the rough matching frame based on the fundamental matrix or the homography matrix; and determine the matching point as an inline point when the reprojection error is smaller than a predetermined threshold, and select a rough matching frame with a largest number of inline points as the final matching frame; and calculate a pose of the current frame based on a pose of the final matching frame.

12. The apparatus of claim 11, wherein the processor circuitry is configured to determine the one or more rough matching frames by:

calculating a Euclidean distance between the global descriptor of each keyframe and the global descriptor of the current frame; and determining a predetermined number of keyframes with a smallest Euclidean distance as the one or more rough matching frames.

13. The apparatus of claim 11, wherein the processor circuitry is configured to determine the final matching frame by:

for each rough matching frame, calculating, for each local descriptor of the current frame, a Euclidean distance between each local descriptor of the rough matching frame and the local descriptor of the current frame, wherein the matching point in the rough matching frame is represented by a local descriptor of the rough matching frame with a minimum Euclidean distance from the local descriptor of the current frame.

14. The apparatus of claim 13, wherein the processor circuitry is further configured to:

discard, for each rough matching frame and each local descriptor of the current frame, the matching point when the minimum Euclidean distance is not less than a predetermined percentage of a second smallest Euclidean distance between the local descriptors of the rough matching frame and the local descriptor of the current frame.

15. The apparatus of claim 13, wherein the processor circuitry is configured to determine the final matching frame further by:

for each rough matching frame, when a number of inline points in the rough matching frame is greater than a predetermined threshold, deriving a Rotation transform and a Translation transform between the rough matching frame and the current frame based on the fundamental matrix or the homography matrix; and

22 calculating the pose of the current frame based on the pose of the rough matching frame, the Rotation transform and the Translation transform between the rough matching frame and the current frame;

calculating a deviation between a predetermined percentage of poses of the current frame calculated based on corresponding rough matching frames; and selecting the rough matching frame with the largest number of inline points as the final matching frame when the deviation does not exceed a predetermined threshold.

16. The apparatus of claim 13, wherein the processor circuitry is configured to calculate the pose of the current frame by:

calculating a Rotation transform and a Translation transform between the current frame and the final matching frame based on the fundamental matrix or the homography matrix between the current frame and the final matching frame; and calculating the pose of the current frame based on the Rotation transform, the Translation transform and the pose of the final matching frame.

17. The apparatus of claim 13, wherein the image features of the current frame comprise a depth value of the keypoint in the current frame, the image features of the final matching frame comprise a depth value of the inline point in the final matching frame, and the processor circuitry is configured to calculate the pose of the current frame by:

calculating a Rotation transform and a Translation transform between the current frame and the final matching frame based on the fundamental matrix or the homography matrix between the current frame and the final matching frame;

calculating a scale S for correcting the Translation transform between the current frame and the final matching frame based on the depth values of the keypoints in the current frame and the depth values of the corresponding inline points in the final matching frame; and calculating the pose of the current frame based on the Rotation transform, the Translation transform corrected by the scale S and the pose of the final matching frame.

18. The apparatus of claim 11, wherein the interface circuitry is coupled to a visual system and a Simultaneous Localization and Mapping (SLAM) system of the robot and the processor circuitry is further configured to:

acquire the set of keyframes from Red Green Blue Depth (RGBD) images received via the interface circuitry from the visual system of the robot during a tracking stage of the robot;

extract the image features of the set of keyframes via a Hierarchical Feature Network (HF-Net) model;

obtain the poses of the set of keyframes via the interface circuitry from the SLAM system of the robot; and store the image features and the poses of the set of keyframes in the keyframe database via the interface circuitry.

19. The apparatus of claim 18, wherein the SLAM system is a Laser SLAM system or a Visual SLAM system.

20. The apparatus of claim 11, wherein the processor circuitry is configured to extract the image features of the current frame via a Hierarchical Feature Network (HF-Net) model.

* * * * *